United States Patent [19]

Atwell et al.

[11] Patent Number: 5,369,202
[45] Date of Patent: Nov. 29, 1994

[54] POLYMERS OR BROMINATED STYRENE

[75] Inventors: Ray W. Atwell, West Lafayette; Harry A. Hodgen, Battle Ground; William R. Fielding, West Lafayette; Nicolai A. Favstritsky; Enrico J. Termine, both of Lafayette, all of Ind.

[73] Assignee: Great Lakes Chemical Corporation, West Lafayette, Ind.

[21] Appl. No.: 215,803

[22] Filed: Mar. 22, 1994

Related U.S. Application Data

[62] Division of Ser. No. 95,865, Jul. 22, 1993, Pat. No. 5,304,618.

[51] Int. Cl.$^5$ .................... C08F 12/16; C08F 14/16
[52] U.S. Cl. ................... 526/293; 526/296; 526/347
[58] Field of Search ................. 526/293, 296, 347

[56] References Cited

U.S. PATENT DOCUMENTS 3,534,012 10/1970 Dennis .
3,794,471 8/1971 Latinen .
4,412,051 10/1983 de Man et al. .
4,755,573 7/1988 Aycock .

FOREIGN PATENT DOCUMENTS

PCTUS8502-378 12/1985 WIPO .

OTHER PUBLICATIONS

CAS Abstract 85:63979 of JP 51/47034 to Hirohisa, dated Apr. 22, 1976.
I. Konigsberg and J. Jagur-Grodzinski, "Anionic Polymerization and Copolymerization of p-Bromostyrene," J. Polym. Sci., Polymn. Chem. Ed. 21(9), 2649-63 (1983).

*Primary Examiner*—Joseph L. Schofer
*Assistant Examiner*—N. Sarofim
*Attorney, Agent, or Firm*—Woodard, Emhardt, Naughton, Moriarity & McNett

[57] ABSTRACT

A process for the solventless polymerization of brominated styrenes includes blending monomers of brominated styrenes with a polymerization initiator, feeding the monomer/polymerization initiator mix into a prepolymerizer wherein the monomers begin to polymerize, and feeding the monomer/polymerization initiator mix and the partially polymerized bromostyrene into a screw-type extruder to drive the polymerization to a high degree of completion in a short period of time. Optionally, the monomers may be preheated before mixing with the initiator, or a heater may be included in the prepolymerizer.

4 Claims, 5 Drawing Sheets

POLYMERS OR BROMINATED STYRENE

This application is a division of application Ser. No. 08/095,865, filed Jul. 22, 1993 now U.S. Pat. No. 5,304,618.

FIELD OF THE INVENTION

The present invention relates generally to polymers of brominated styrene, and more particularly to methods for the solventless bulk polymerization of brominated styrenes.

BACKGROUND OF THE INVENTION

A variety of polymers of brominated styrene are known to the art. These brominated polystyrenes are commonly used as flame retardant additives, and are produced by one of two basic methods—the bromination of polystyrene or the polymerization of bromostyrene monomers.

In general, the materials made by the two production methods are not equivalent. For example, bromination of polystyrene will result in undesirable side chain halogenation, causing a reduction in thermal stability or requiring expensive treatment to remove the more labile bromine atoms. Polymers prepared by the polymerization of bromostyrene do not have undesirable side chain halogenation, and are preferred for their relatively greater thermal stability.

Not only do the two methods of preparing brominated polystyrenes provide different end products, there are also numerous disadvantages inherent to the bromination of polystyrene approach. First, such methods require that the polymer be solubilized, necessitating isolation and purification procedures that may add significantly to production costs. Also, because the product is recovered from solution, the final product will be a dusty powder unless some type of compaction step is included at additional cost. Similarly, unless a post-production compounding step is used, the introduction of co-additives is limited to dry blending with other powders.

A more significant disadvantage of the bromination of polystyrene method is that the brominated polystyrenes produced are limited to copolymer compositions and molecular weights that are readily available. In addition, the products must be structures that are stable to, and will not interfere with, the bromination process.

The polymerization of bromostyrene has several advantages over the bromination of polystyrene. As mentioned, it provides a more thermally stable product because side chain halogenation is avoided. Also, this method can be used to produce a continuum of molecular weights and bromine contents not otherwise available. Further, the polymerization can be accomplished without the use of solvents, and is readily adaptable to more economical continuous production processes. In addition, a broad spectrum of copolymer compositions may be produced simply by adjusting the monomer feed. Finally, production of convenient non-dusting pellets (with the option of incorporating auxiliary additives) is a natural by-product of the inventive polymerization process, and may be provided at no additional cost.

Nowhere in the literature of bromostyrene polymers is there any indication that the practical bulk polymerization of these monomers to produce a highly brominated compositions has been addressed. One reason for this omission may be the lack of thermal stability of the brominated materials. Conditions that would normally be used to prepare commercial polystyrene (such as flash devolatilization at temperatures approaching 300° C.) would cause thermal breakdown of most brominated materials, and product discoloration and equipment corrosion would result. Processes using solution and emulsion techniques avoid any possibility of decomposition, even though they are at an economic disadvantage.

A need therefore exists for improved methods of continuously polymerizing bromostyrenes. In particular, a need exists for a method of polymerizing bromostyrenes without the need of solvents and their associated disadvantages. A need also exists for a method of polymerizing bromostyrenes in which the reaction is run to a high degree of completion in a relatively brief period of time. The present invention addresses these needs.

SUMMARY OF THE INVENTION

Briefly describing one aspect of the present invention, there is provided a process for the solventless polymerization of brominated styrenes, comprising the steps of: (a) blending monomers of brominated styrenes with a polymerization initiator; (b) feeding the monomer/polymerization initiator mix into a prepolymerizer wherein the monomers begin to polymerize; and (c) feeding the monomer/polymerization initiator mix and the partially polymerized bromostyrene into a screw-type extruder to drive the polymerization to a high degree of completion in a short period of time. Optionally, the monomers may be preheated before mixing with the initiator, or a heater may be included in the prepolymerizer. Also, a second initiator may be used to facilitate polymerization in the extruder reaction zone.

One object of the present invention is to provide a continuous process for producing brominated styrene homo- and copolymers, wherein the process uses an extruder for at least a portion of the polymerizations.

A further object of the present invention is to provide a screw-type extruder effective for providing a high degree of conversion from monomer to polymer while maintaining an unexpectedly high molecular weight.

A further object of the present invention is to provide an improvement to the basic polymerization process in which the early stages of the polymerization are carried out in a prepolymerizer which may optionally be preceded by a preheater.

It is also an object of the present invention to provide an improved polymerization process in which the free radical source for the prepolymerizer is selected so as to provide rapid initiation at temperatures below 100° C.

Another object of the present invention is to provide an improved polymerization process in which desired additives may be introduced continuously into the brominated polymer during polymerization, thereby avoiding the expense of a separate compounding step.

An additional object of the present invention is to provide polymers that contain about 50% or more by weight of brominated styrene and that are useful as flame retardant additives.

A further object of the present invention is to provide a flame retarding polymer comprised predominantly of brominated styrene and having an APHA solution color of less than 500 following heat ageing for eight hours at 243° C. in a test tube.

DESCRIPTION OF THE PREFERRED EMBODIMENT

Figure 1:
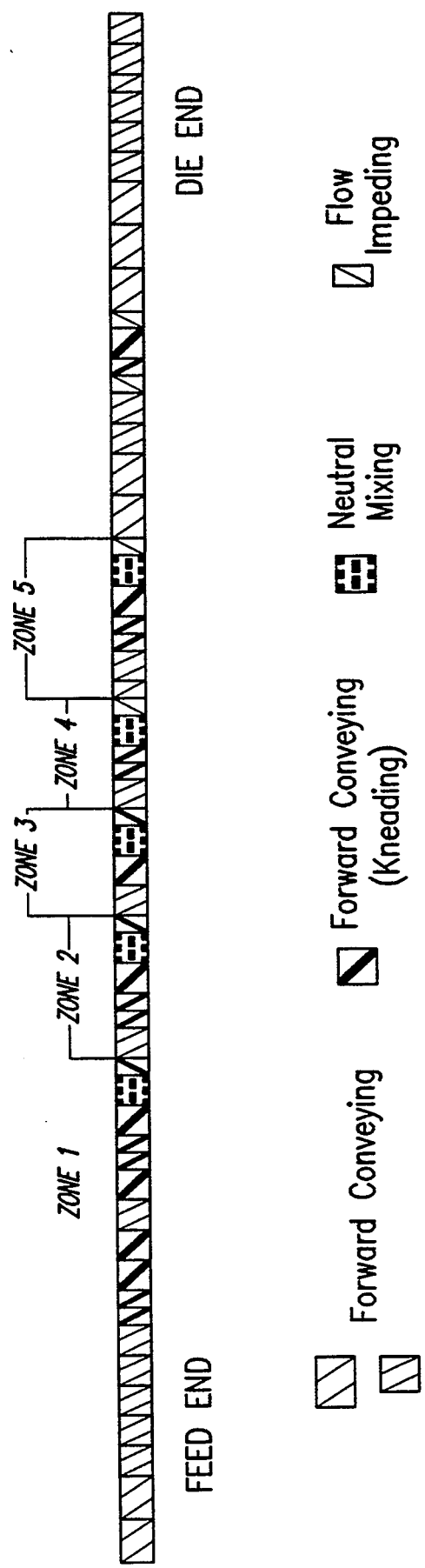
FIG. 1 is a schematic diagram of one screw extruder used in the processes of the present invention.
Figure 2:
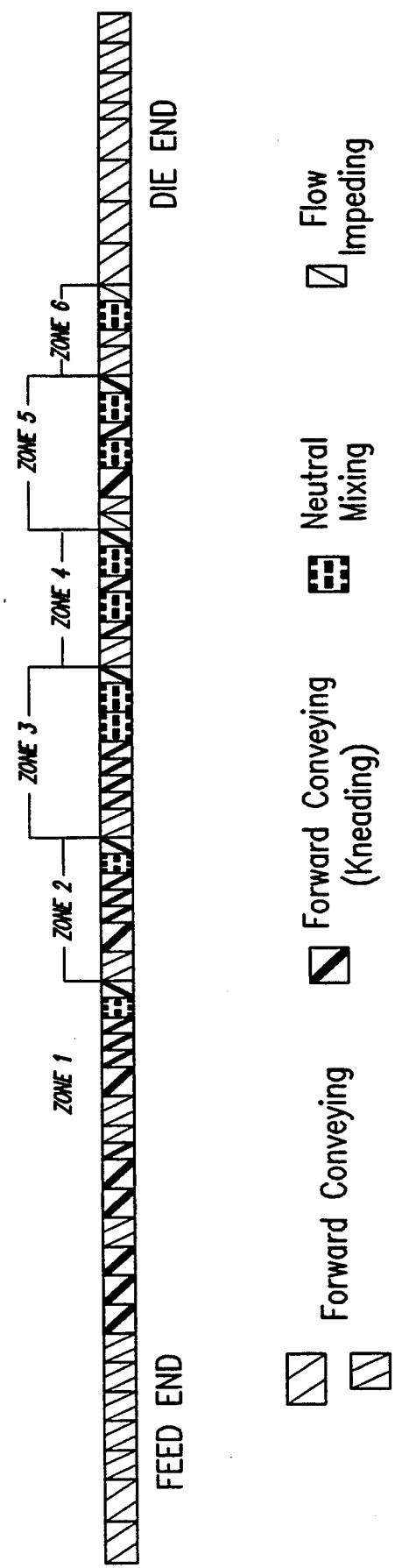
FIG. 2 is a schematic diagram of a second screw extruder used in the processes of the present invention.
Figure 3:
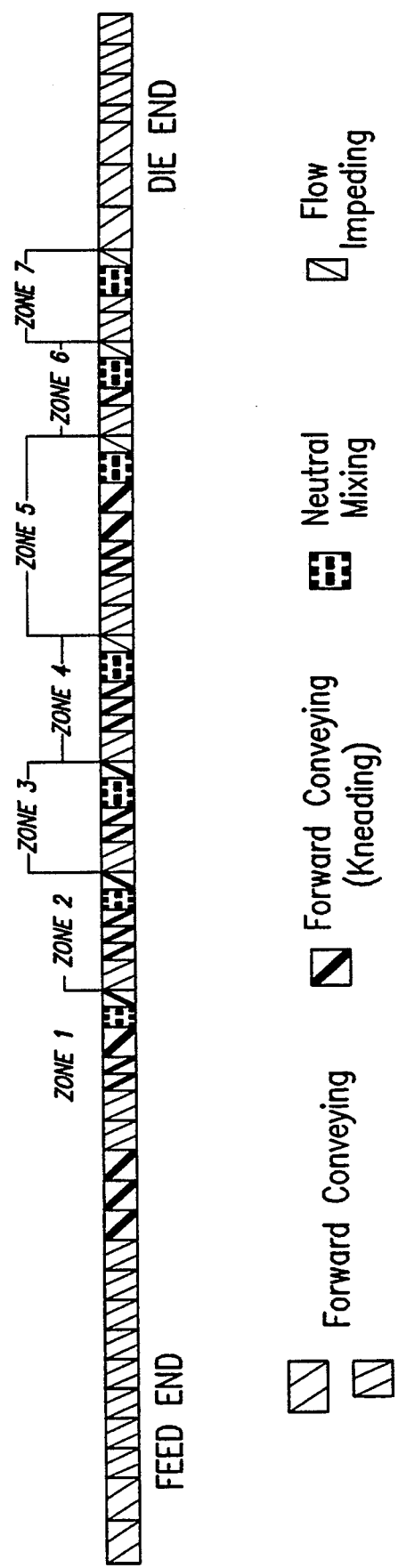
FIG. 3 is a schematic diagram of a third screw extruder used in the processes of the present invention.
Figure 4:
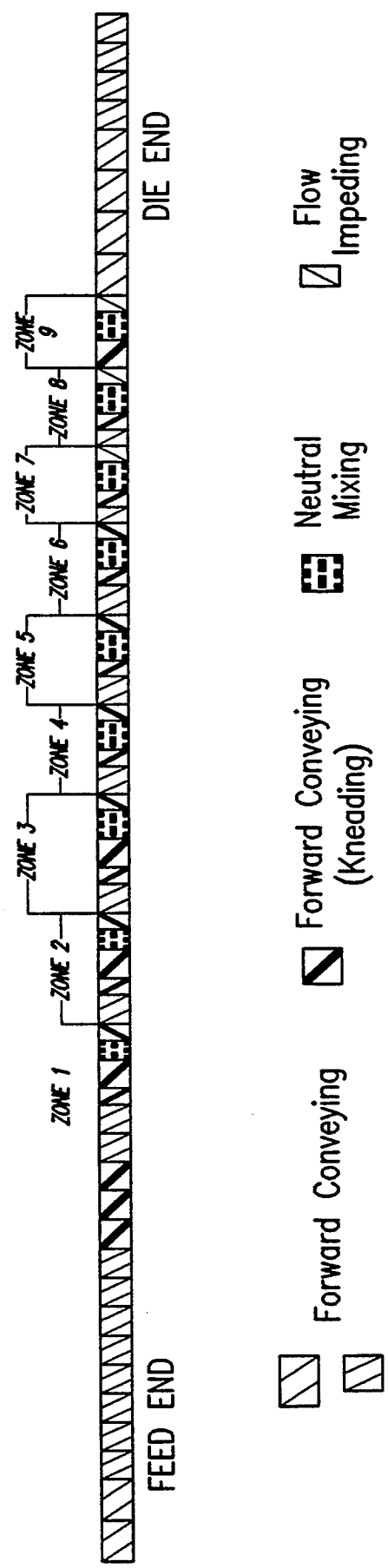
FIG. 4 is a schematic diagram of a fourth screw extruder used in the processes of the present invention.

For the purposes of promoting an understanding of the principles of the invention, reference will now be made to preferred embodiments and specific language will be used to describe the same. It will nevertheless be understood that no limitation of the scope of the invention is thereby intended, such alterations and further modifications in the described embodiments, and such further applications of the principles of the invention as illustrated therein, being contemplated as would normally occur to one skilled in the art to which the invention pertains.

As briefly described above, the present invention provides a process for the continuous bulk polymerization of brominated styrene monomers without the need for hazardous or costly solvents. The invention utilizes an extruder as a reaction pot to maintain a very short reaction time while controlling the potentially damaging exotherm. Either a single screw or twin screw extruder may be utilized, with the twin screw design being preferred for reasons of higher productivity, better mixing and the ability to take the reaction to a higher degree of completion.

In the extreme, the entire reaction may be carried out in the extruder, using an initiator to accelerate the polymerization. The initiator is conveniently blended into the monomer with the mixture then being fed into the extruder throat. Optionally, a second addition of monomer plus initiator can be made at a point several barrels downstream from the throat. The advantage of this is an increase in productivity; the slower continuous feed at the throat acts as a rear seal for the screw, allowing the faster second feed to be injected under pressure. This avoids the delay of having to wait for the rotating screw elements to carry away low viscosity monomer from the feed throat.

The screw design of the extruder of the present invention is based on the need to control the reaction by subdividing the polymerization into a series of reaction zones. As a comparative example, the extruder might be designed to have only one reaction zone. Such an extruder might be considered to be a plug flow reactor in which the first barrels are used to heat the monomer to polymerization temperature. The middle sections would then contain the highly exothermic runaway polymerization, and the end barrels would further reduce monomer content. Deficiencies flowing from this design include the inability to control temperature in the middle sections, as well as the inability to take the reaction to a high degree of completion. The inability to control temperature in the middle sections allows excessive temperatures to occur during the major portion of the reaction, eliminating the option of producing higher molecular weight versions of the product and possibly causing thermal degradation. The inability to take the reaction to a high degree of completion is probably caused by inadequate monomer mixing.

The preferred embodiments of the present invention avoid the aforementioned problems by spreading the reaction out over a larger number of barrels. This is accomplished by selecting a screw design comprising at least three reaction zones. Each of the zones is characterized by three types of elements in the following order: (1) forward conveying, (2) neutral mixing, (3) flow impeding. The forward conveying elements can be of a normal flighted feeding type, conveying kneading type, or similar design intended to move material through the barrel toward the die. The neutral mixing section may consist of neutral kneading blocks, turbine blades or other designs that will mix materials but have little or no conveying effect. The last element type is a flow impeding design such as a reverse pumping element or a constricting element—sometimes referred to as a blister—which partially blocks the barrel, causing back pressure.

The series of reaction zones may be preceded by a number of forward conveying elements. These will help to move material away from the throat, into the reaction zones, and serve to form a rear seal for the screw. The reaction zones may also be followed by forward conveying elements in order to move product away from the reaction zones and to develop the pressure required to force product through the die.

It has been discovered that the number of required reaction zones is determined in part by the size (screw diameter) of the extruder. For example, in a 57 mm machine acceptable results were achieved with just five reaction zones. In scaling up to a 70 mm extruder however, acceptable results required seven zones, and significant improvements were obtained with a nine-zone design.

The initiator for the extruder phase of the reaction may be selected from free radical generators well known to the industry. The preferred initiators have a reactivity such that they cause rapid polymerization of bromostyrenes to begin at temperatures above approximately 75° C. Examples of initiators that may be used to begin polymerizations within the extruder include dicumyl peroxide
di-t-butyl peroxide
2,5-dimethyl-2,5-bis(t-butylperoxy)hexane
benzoyl peroxide
cumene hydroperoxide
t-butyl hydroperoxide The initiators are normally used at loadings from 0.05% to 5% on weight of monomer with levels from 0.1% to 2% being typical. Further, blends of free radical generators may be employed with the intent of one initiating most of the polymer formation at a lower temperature to maximize molecular weight, and a second more stable one becoming active towards the end of the reaction in order to reduce levels of unreacted monomer.

In one preferred embodiment, the extruder is used to complete the reaction which was begun in a prepolymerizer. Several designs would be suitable as a prepolymerizer. In the broadest sense, a prepolymerizer is a vessel through which monomer or mixtures of monomers are continuously introduced while a mixture of monomer and polymer is continuously removed. It is preferred that the contents of the vessel be agitated in some fashion to prevent localized areas of high polymer content. Means for heating the contents are desirable, but are not required if a preheater is used. Examples of suitable prepolymerizers include stirred tank reactors, static mixing tubes, and even other extruders.

A low temperature, free radical generator is used to initiate the reaction when a prepolymerizer is utilized. The initiator may be selected from peroxides, azo compounds, and other free radical generators known to the industry. Preferred initiators have a reactivity such that they cause rapid polymerization of bromostyrenes at temperatures below approximately 100° C. This reactivity is normally expressed in terms of the half life temperature. The initiators of the present invention are selected such that at least half of the initiator has decomposed when held for 1 hour at 100° C. Examples of products meeting this requirement are benzoyl peroxide
t-butylperoctoate
t-butylperoxypivalate
decanoyl peroxide
di(2-ethylhexyl) peroxydicarbonate
2,2'-azobis (2,4-dimethylvaleronitrile)
2,2'-azobis(isobutyronitrile) The most preferred is 2,2'-azobis(2,4-dimethylvaleronitrile). The low temperature initiator is used at levels of from about 0.05% to 5% by weight of the monomer, with levels from 0.1% to 2% being preferred.

In addition, accelerants or promoters may be used to reduce the half life temperature (increase the reactivity) of an initiator. For example, the combinations of benzoyl peroxide/dimethylaniline and methylethylketone peroxide/cobalt soaps are well known to provide low temperature reactivity.

The monomer may be 10% to 95% converted to polymer upon exiting the prepolymerizer, with a range of 40% to 95% being preferred. Upon entering the extruder the addition of a high temperature initiator or blend of initiators may be desirable to complete the polymerization. The initiator may be added along with the monomer/polymer mixture, or may be injected several barrels-downstream. Examples of suitable free radical generators are listed above (1 hour half lives above 75° C.) with 2,5-dimethyl-2,5-bis(t-butylperoxy)-hexane being most preferred.

The brominated monomers may have the general formula

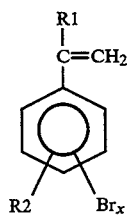

where R1=H, CH3; R2=H, C1-4 alkyl; x=1 to 5.

Preferred monomers are those in which R1=R2=H. The most preferred monomer is dibromostyrene (DBS). As produced by Great Lakes Chemical Corporation DBS normally contains about 15% monobromostyrene and about 3% tribromostyrene by weight. In one preferred embodiment then, the bromostyrene monomers comprise from about 1% to about 20% monobromostyrene, from about 0.5% to about 10% tribromostyrene, and from about 70% to about 98.5% dibromostyrene.

The monomer may also contain various storage stabilizers such as phenols or compounds of sulfur, nitrogen and phosphorus known to the industry to inhibit premature polymerization. Optionally, the stabilizer may be removed prior to polymerization by water washes or by passing the monomer through a bed of activated carbon, silica, alumina or the like. Although water washes are not required, they provide the benefit of producing faster and more consistent reactivity.

One advantage of the inventive process is the ability to produce a variety of molecular weight polymers within a particular piece of equipment by making only minor changes. It is very desirable and useful to offer these different product variations. For example, a low molecular weight brominated polystyrene is known to provide better impact strength in rubber modified polystyrene, while the higher melt viscosity of the high molecular weight versions is preferred for processing characteristics with certain nylons.

The modification of molecular weight may be accomplished through several different approaches. Traditional chain transfer agents such as compounds of sulfur or aliphatic halides may be added to the monomer prior to the start of the reaction. For example, 1-dodecanethiol or bromotrichloromethane are known to be very effective. A second approach is to simply increase the loading of initiator used to begin the polymerization. Higher concentrations of active chain initiators increase the competition for available monomer and promote certain chain terminating reactions. Both of these approaches will shorten the average chain length. A third way to reduce molecular weight is to conduct the polymerization at a higher temperature. This will also increase the concentration of active initiators, as well as increase the probability of chain terminating reactions occurring before chains have grown to high molecular weight.

Prior to polymerization, a minor amount of other reactive unsaturated monomers can be mixed into the brominated styrene for the purpose of additional property modification. Examples of modifications that might be desirable include changes in color, clarity, lubricity, compatibility, melt viscosity, softening point, thermal stability, ultraviolet stability, viscoelastic behavior, polarity, biodegradability and static charge dissipation. Examples of potential reactive comonomers are maleic anhydride, styrene, substituted styrenes such as α-methylstyrene and chloromethylstyrene, acrylonitrile, methylmethacrylate, acrylic acid, methacrylic acid, butadiene and acryiamide.

Because the polymers used in the process are molten thermoplastics during the extruder stage, it is an advantage that nonreactive additives may be incorporated during the process without the expense of a separate compounding step. Metered addition of materials may be accomplished at the feed throat or via a "crammer feeder" attached to any of the extruder barrels while polymerization is being completed in the extruder. The product exiting the extruder is therefore a very desirable package of additives in a homogeneous pellet form, produced without the expense of separate blending and compounding steps.

Examples of additives that might be included in the package include antioxidants, ultraviolet absorbers, antistatic agents, pigments, dyes, nucleating agents, fillers, slip agents, lubricants, antiblocking agents, plasticizers, tougheners and antimicrobials. Further, supplemental flame retardants may be incorporated into the package. These may include nonhalogenated materials such as $Sb_2O_3$, $Sb_2O_5$, $Bi_2O_3$, $MoO_3$, $NH_4NO_3$, trityl compounds, 2,3-dimethyl-2,3-diphenylbutane, peroxides, and various phosphorous and/or nitrogen containing materials. The bromostyrene polymers may also include other halogenated flame retardants which could be used to increase the overall halogen content, improve efficiency or reduce dripping during combustion. Examples of potential halogenated additives include decabromodiphenyloxide
octabromodiphenyloxide
bis(tribromophenoxy)ethane
decabromodiphenylethane
bisimide of tetrabromophthalic anhydride and ethylenediamine Reference will now be made to specific examples using the processes described above. It is to be understood that the examples are provided to more completely describe preferred embodiments, and that no limitation to the scope of the invention is intended thereby.

EXAMPLES

In the following examples molecular weights are given as "$M_{PS}$", or peak molecular weight versus polystrene standards. This is determined by gel permeation chromatography in which the peak retention time of the bromostyrene polymer is equated with the molecular weight of a polystyrene standard having the same retention time.

Example 1

Example 1 demonstrates the use of a single screw extruder as a continuous prepolymerizer.

A Brabender Prep Center single screw extruder (L/d=25/1, all zones at 150° C., 40 rpm's) was fed DBS containing 0.125% t-butylperoxy-2-ethylhexanoate at a rate of approximately 5 pounds per hour. The material exiting the die was collected on dry ice to quench the reaction and was found to contain 20.4% residual monomer, with the polymeric portion having a molecular weight $M_{PS}$ of 81,900.

Example 2

A heated static mixing tube was successfully used as a continuous prepolymerizer.

Six feet of 0.5 inch diameter stainless steel static mixing tube was jacketed within a 2 inch cast iron pipe. The area between the tube and the pipe was filled with oil which was continuously recirculated to an external heater. With the oil temperature held at approximately 165° C., dibromostyrene containing 0.03% t-butyl peroxy-2-ethylhexanoate (also known as t-butylperoctoate) was pressured through the static mixer at an average rate of 93 grams/minute. The product was collected as in Example 1. The product had an average molecular weight of 77,500, and contained 21% unreacted monomer.

Example 3

A single screw extruder was used to complete the reaction begun in a prepolymerizer.

Partially converted dibromostyrene prepared using a single screw extruder as in Example 1 was collected and ground. A blend of 0.5 parts di-t-butylperoxide per 100 parts of monomer/polymer mixture was continuously fed into the same single screw extruder of Example 1, but with a hotter temperature profile. Settings of 210°, 210°, 220°, 220°, and 230° C. from throat to die were maintained. At a screw speed of 60 rpm's the material going through the extruder had an estimated residence time of 55 seconds and was processed at a rate of 33 pounds per hour. Before processing the material had an $M_{PS}$ of 81,400 and contained 13.4% monomer. After the reaction, the molecular weight was 70,000 and the monomer was reduced to 0.5%. Accordingly, it can be seen that the prepolymerizers of Example 1 or 2 could be arranged in tandem with the extruder of Example 3 to provide a continuous process.

Example 4

High molecular weight polydibromostyrene was prepared using a 30 mm twin screw extruder as the only reactor.

A Werner & Pfleiderer twin screw extruder (Model ZSK-30, L/d=44/1) was continuously fed dibromostyrene/peroxide mixtures at two points simultaneously. The temperature profile was maintained at 160°, 155°, 185°, 205°, 205°, 220°, 230° and 240° C. from throat to die while the screw speed was set at 400 rpm's. The compositions and rates of feed were:

| FEED POINT | FEED | ADDITIVES, % OF MONOMER | FEED RATE, LBS/HR |
| --- | --- | --- | --- |
| Throat | DBS | 0.125% t-butylperoxide | 10.5 |
| Port | DBS | 0.125% di-t-butylperoxide + 0.0625% t-butylperoctoate | 23.1 |
| | | TOTAL | 33.6 |

The feed throat was located in the first barrel and the injection port was approximately one-fourth of the way towards the die. Experimentation determined that 30 to 35 lbs/hr was the maximum effective feed rate. Increasing monomer flow at either point resulted in flooding of the throat.

A clear amber thermoplastic material was collected at the die. Analysis showed that it had an average molecular weight of $M_{PS}$=72,700 with a residual monomer content of 0.53%. Accordingly, it can be seen that the polymer could be continuously produced at a reasonable rate using only a twin screw extruder.

Example 5

Low molecular weight polydibromostyrene was also prepared in the twin screw extruder.

Using the same extruder as in Example 4, but with different temperature settings and feed composition, low molecular weight polydibromostyrene was continuously produced. Zone temperatures averaged 155°, 160°, 155°, 155°, 155°, 220°, 155° and 170° C. Screw speed remained at 400 rpm's. The compositions and rates of feed were:

| FEED POINT | FEED | ADDITIVES, % OF MONOMER | FEED RATE, LBS/HR |
| --- | --- | --- | --- |
| Throat | DBS | 1.0% t-butylperoctoate + 1.0% 1-dodecanethiol | 11.0 |
| Port | DBS | 0.5% t-butylperoctoate + 1.0% t-butylperbenzoate + 1.0% 1-dodecanethiol | 23.9 |
| | | TOTAL | 34.9 |

Analysis of the product showed that it had an average $M_{PS}$ of 8,600 with a residual monomer content of 0.45%. This material has a glass transition temperature 35° C. lower than that of the polymer in Example 4, indicating that the two materials are substantially different. Both can be continuously produced in the same equipment however, demonstrating the flexibility of the process.

Examples 6, 7, 8 and 9

The importance of the extruder screw design was demonstrated in larger scale production.

A Werner & Pfleiderer Model ZSK-70 twin screw extruder was configured similarly to that used in Examples 4 and 5. It had an L/d=44/1 and was fitted with an injection feed port. Typical zone temperatures were 160°, 160°, 160°, 160°, 160°, 190°, 220°, 230° and 215° C. while the screw speed was maintained at 400 rpm's. Monomer feed information is shown below.

| FEED POINT | FEED | ADDITIVES, % OF MONOMER | FEED RATE, LBS/HR |
|---|---|---|---|
| Throat | DBS | 0.25% t-butylperoctoate | 145 |
| Port | DBS | 0.20% t-butylperoctoate + 0.15% cumenehydroperoxide | 285 |
| | | TOTAL | 430 |

Using these conditions, four screw designs were evaluated for their ability to produce the highest molecular weight and the lowest residual monomer. Schematics of the designs are shown in FIGS. 1 through 4. Typical values for the material produced with each design are shown below.

| EXAMPLE | SCREW DESIGN | RESIDUAL MONOMER, % | MOLECULAR WEIGHT, $M_{PS}$ |
|---|---|---|---|
| 6 (Comparative) | 1 | 2.6 | 48,000 |
| 7 (Comparative) | 2 | 0.5 | 43,000 |
| 8 (Comparative) | 3 | 0.7 | 50,000 |
| 9 | 4 | 0.7 | 62,000 |

The screw design in Example 6 contained 5 reaction zones. This did not provide adequate control of the reaction, spreading it out over just a long enough section to provide only medium molecular weight polymer. And with only 5 mixing areas the monomer content was still too high at the vented barrel to permit vacuum devolatilization without foaming. The design in Example 7 increased the number of reaction zones from 5 to 6 by adding a small section of neutral turbine mixers. This reduced the monomer to the point at which a vacuum could be applied, but molecular weight was still in the medium range. In Example 8 the number of reaction zones was increased from 6 to 7, producing acceptable residual monomer and some improvement in molecular weight. However, it was not until Example 9, increasing the number of reaction zones to nine, that high molecular weight and low residual monomer were achieved.

Example 10

A supplemental flame retardant was incorporated into polydibromostyrene during continuous production.

Using the same extruder as in Example 4, decabromodiphenyloxide (DBDPO) was continuously introduced into the reaction mixture to produce a blend of flame retardants in a single step. The following materials were used:

| FEED POINT | FEED | ADDITIVES, % OF MONOMER | FEED RATE, LBS/HR |
|---|---|---|---|
| Throat | DBS | 0.20% t-butylperoctoate | 10.6 |
| Throat | DBDPO | — | 12.3 |
| Port | DBS | 0.185% t-butylperoctoate + 0.155% cumenehydroperoxide | 24.5 |
| | | TOTAL | 47.4 |

The temperature profile was maintained at approximately 140°, 150°, 180°, 180°, 200°, 220°, 230° and 240° C. from throat to die. Screw speed was 400 rpm. The polymeric portion of the product had an $M_{PS}$ of 59,800, while the overall composition had a monomer content of 0.88%. The product had a calculated bromine content of 66% (compared with 60% for the neat homopolymer). Accordingly, less of the blend would be required as a flame retarding additive, making it a more efficient and valuable product while being produced at no greater of a manufacturing cost than the homopolymer itself.

Example 11

An inorganic synergist was also incorporated during continuous polymerization.

Using essentially the same reaction conditions as in Example 10, antimony trioxide was continuously metered into the extruder throat along with monomer. Non-dusting plastic pellets containing high levels of bromine and antimony were produced. The ability to provide both components in a single package—as well as the ability to eliminate the need for the customer to handle powdered $Sb_2O_3$—is a significant advantage of the present invention.

Example 12

A prepolymerizer was used to increase the production rate of DBS homopolymer.

Figure 5:
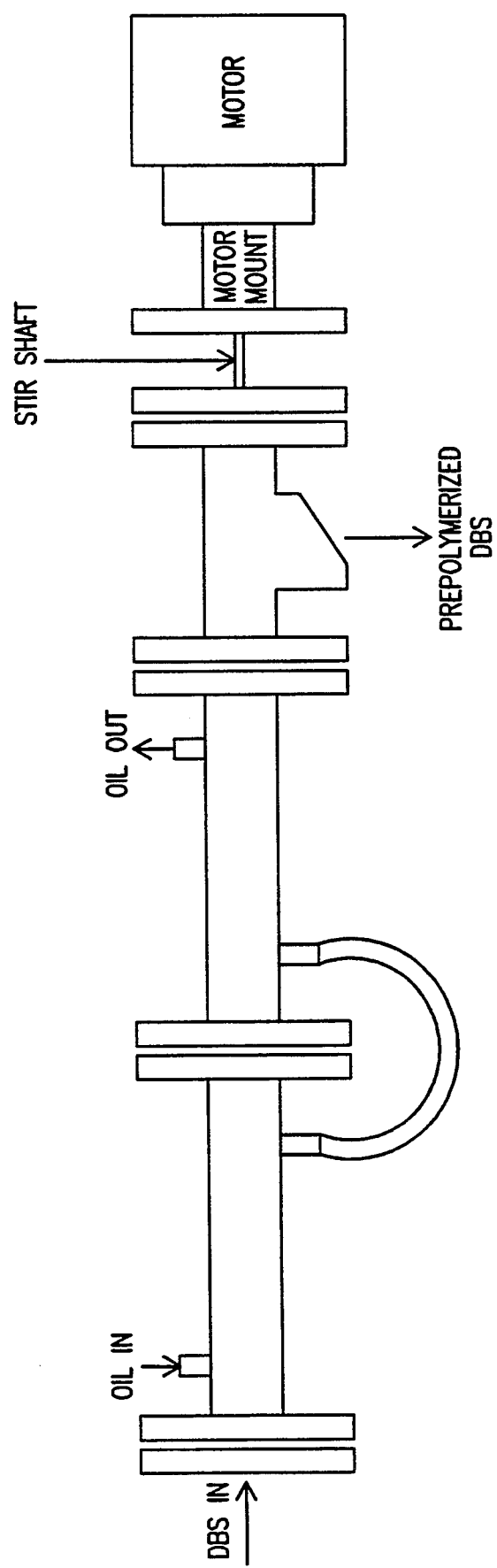
FIG. 5 is a diagram of a prepolymerizer used in one preferred embodiment of the present invention.

A prepolymerizer was constructed as shown in FIG. 5. In essence it was an elongated stirred tank reactor consisting of a 2 inch jacketed pipe containing a full length stir shaft fitted with a variety of blade types. Heating/cooling was accomplished by pumping oil of the desired temperature through the jacket. Monomer plus peroxide was continuously pumped into the bottom of the reactor and overflowed from the top directly into the twin screw extruder described in Example 4. The temperature profile of the extruder was 200°, 210°, 210°, 210°, 210°, 220°, 220° and 220° C. with a screw speed of 400 rpm's. Oil temperature to the prepolymerizer was 145° C. A high temperature peroxide was injected neat into the extruder to complete the reaction.

| FEED POINT | FEED | ADDITIVES, % OF MONOMER | FEED RATE, LBS/HR |
|---|---|---|---|
| Prepolymerizer | DBS | 0.25% t-butylperoctoate | 71.4 |

The partially converted material exiting the prepolymerizer contained 14 to 20% monomer, but after passing through the extruder this was reduced to 0.82%. Molecular weight averaged an $M_{PS}$ of 49,700. The productivity of this design represents a two fold increase over that seen in Example 4 where the prepolymerizer was not used.

Example 13

A preheater and a low temperature initiator were used to further increase productivity and to reduce the peak temperature.

The equipment in Example 12 was modified by adding a preheater to the system directly before the prepolymerizer. The preheater consisted of a 3 ft. long single pass stainless steel heat exchanger using recirculated tempered water as the heat source. Dibromostyrene monomer was passed through the preheater, warming it to about 70° C. before it entered the prepolymerizer. The low temperature initiator was injected into the monomer just before it entered the prepolymerizer. Oil temperature to the prepolymerizer was reduced to 135° C. A high temperature peroxide was injected neat into the extruder to complete the reaction.

| FEED POINT | FEED | ADDITIVES, % OF MONOMER | FEED RATE, LBS/HR |
|---|---|---|---|
| Prepolymerizer | DBS | 0.1% 2,2'-azobis(2,4-dimethylvaleronitrile) | 85 |
| Port | — | 0.5% 2,5-dimethyl-2,5-bis(t-butylperoxy)hexane | |

The polymer produced under these conditions had an $M_{PS}$ of 64,000 with a residual monomer of 0.35%.

The introduction of the preheater and low temperature initiator had several beneficial effects. For example, production rates were significantly increased over the 71.4 lbs/hr of the previous Example. This was accomplished by preheating the materials to near reaction temperature before entering the prepolymerizer, making the prepolymerizer more efficient.

Also, the peak temperature within the prepolymerizer was reduced. The higher temperature peroxide used in Example 12 required that the reactants be heated to approximately 145° C. to provide rapid polymerization. The exothermic polymer formation resulted in peak temperatures as high as 280° C. This is not desirable since low levels of thermal decomposition will occur, lowering product quality. The initiator of the current Example caused the reaction to begin at a lower temperature. Since the heat of polymerization is independent of the temperature at which the reaction begins, the lower initiation provided a peak exotherm of around 200° C., well below the point of thermal decomposition.

Finally, molecular weight was increased. Because of the factors described above, most of the polymer is formed at a lower temperature where chain termination reactions are less prevalent.

Example 14

A copolymer of dibromostyrene was prepared using the design of this invention.

A mixture of 60% dibromostyrene/30% styrene/10% acrylic acid by weight and containing 0.1% 2,2'-azobis(2,4-dimethylvaleronitrile) was processed through the equipment of Example 13. High temperature peroxide was injected into the extruder to complete the reaction. The product was a thermoplastic material with a calculated bromine content of 36%, and was useful as a flame retardant additive in polar resin systems.

Example 15

The thermal stability of a DBS homopolymer, PDBS, was compared with that of a polymeric material obtained by bromination of polystyrene (BrPS).

A sample of each material was placed in a test tube which was then inserted into a heating block maintained at 243° C. The contents were held at temperature and exposed to air for 8 hours, after which the samples were cooled and removed by breaking away the glass. Colors of the heat treated materials were determined by dissolving them in toluene and comparing them with APHA standards. The PDBS demonstrated significantly less color formation, indicating less thermal decomposition.

| Sample | APHA Color (lg/50 ml toluene) |
|---|---|
| PDBS | 400 |
| BrPS | >500 |

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A process for the polymerization of brominated styrenes, comprising the steps of:
    (a) providing an essentially solventless blend of:
        (i) monomers of brominated styrenes; and
        (ii) a polymerization initiator;
    (b) feeding the monomer/polymerization initiator blend into a prepolymerizer;
    (c) reacting the monomer/polymerization initiator blend in the prepolymerizer for a time of between about 1 minute and about 5 minutes, wherein said reacting is effective to polymerize at least about 20% of the monomers of brominated styrenes;
    (d) feeding the reaction blend of step (c) into a reaction vessel;
    (e) reacting the reaction blend under conditions effective to polymerize at least about 80% of the monomers in a time between about 1 minute and about 20 minutes; and
    (f) removing the polymerized bromostyrene from the reaction vessel.

2. A process according to claim 1 wherein the monomers of brominated styrenes are preheated before entering the prepolymerizer.

3. A process according to claim 1 wherein the monomers of brominated styrenes are heated while contained in the prepolymerizer.

4. A process according to claim 1 and further including the step of blending said monomers with a second polymerization initiator after the monomer/polymerization initiator has been introduced into the reaction vessel.

* * * * *